United States Patent [19]

Millard

[11] Patent Number: 5,067,245
[45] Date of Patent: Nov. 26, 1991

[54] INSTANT PLACEMENT DOWN ROD

[76] Inventor: David W. Millard, P.O. Box 275, Hollywood, S.C. 29449

[21] Appl. No.: 497,839

[22] Filed: Mar. 23, 1990

Related U.S. Application Data

[63] Continuation of Ser. No. 52,444, May 21, 1987, abandoned.

[51] Int. Cl.$^5$ .................................................. G01C 15/00
[52] U.S. Cl. .......................................... 33/289; 33/286
[58] Field of Search .................................. 33/289, 286

[56] References Cited

U.S. PATENT DOCUMENTS

| | | | |
|---|---|---|---|
| 2,335,066 | 11/1943 | LaMar | 33/289 |
| 2,869,238 | 1/1959 | Sterling | 33/289 |
| 2,900,727 | 8/1959 | Clime | 33/289 |
| 3,300,861 | 1/1967 | Lily | 33/289 |
| 3,482,317 | 12/1969 | Truax | 33/289 |
| 3,752,588 | 8/1973 | Chapman | 33/289 |
| 4,090,708 | 5/1978 | McPeak | 33/289 |
| 4,764,010 | 8/1988 | Buchmann et al. | 33/286 |

*Primary Examiner*—William A. Cuchlinski, Jr.
*Assistant Examiner*—Wm. Dowling
*Attorney, Agent, or Firm*—Cort Flint

[57] ABSTRACT

A combination down marker and football position determining device for use by football game officials to indicate the down of play and the location of the football relative to the sideline of the football field. A compound prism member mounted within the marker rod allows quick and accurate position determination.

10 Claims, 1 Drawing Sheet

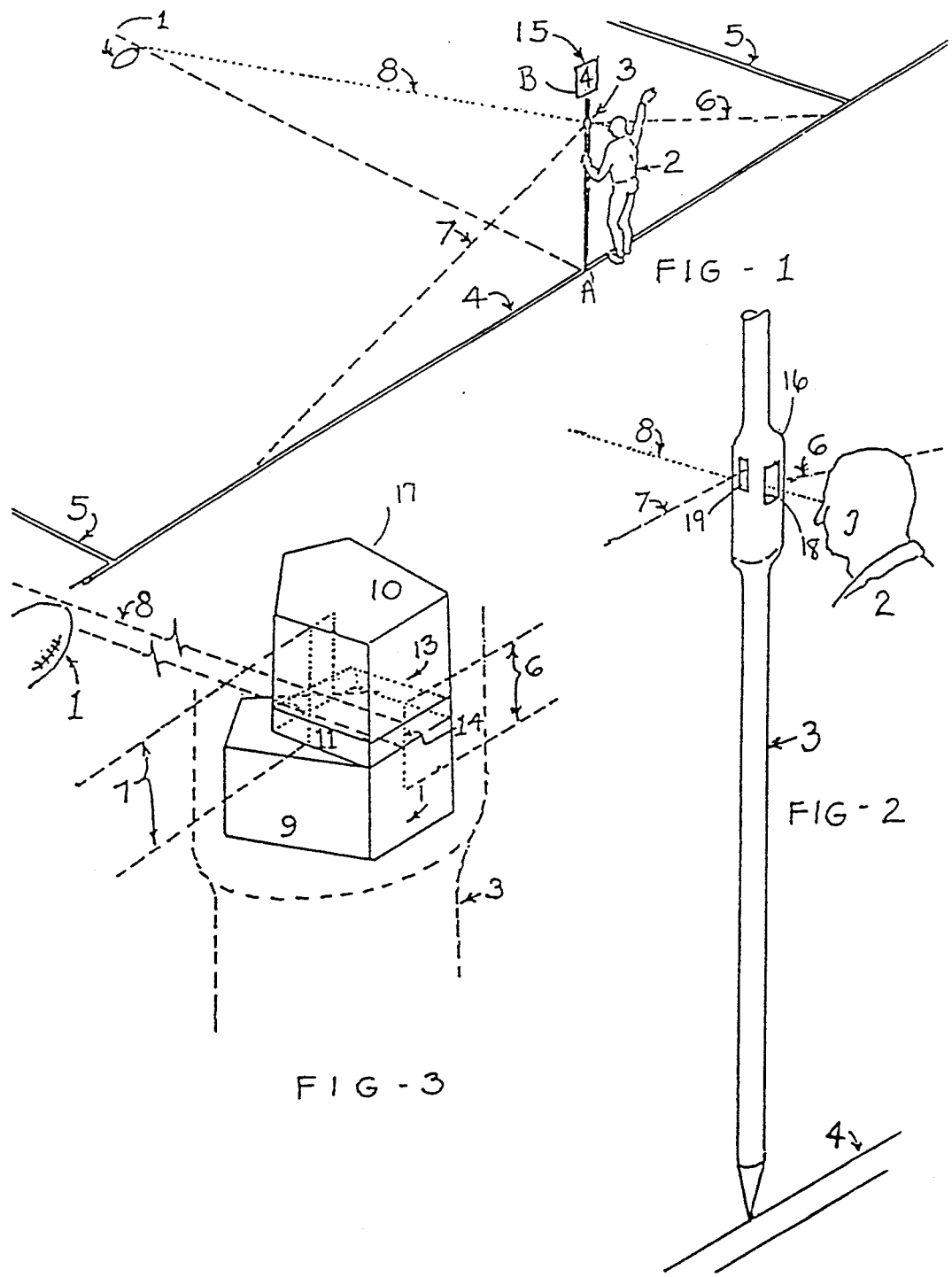

INSTANT PLACEMENT DOWN ROD

This is a continuation of copending application Ser. No. 07/052,444 filed on May 21, 1987, and now abandoned.

BACKGROUND OF THE INVENTION

In the game of football, a key requisite is the accurate positioning of the down marker on the sideline relative to the position of the football on the field of play. Also, equally important is the accurate re-positioning of the football relative to the down marker after an incomplete pass or a disallowed play.

The many attempts in the past to provide a device to accomplish the above noted football locating have not been successful because they were too cumbersome. Devices employing boxes of mirrors, optical lasers, or battery assisted systems have not been acceptable. To date, the location of the down marker or the football is determined by the judgment of the game officials.

SUMMARY OF THE INVENTION

This invention provides a sighting and marking arrangement for use in making instant decisions regarding, the spotting, or establishment of the exact location of the football on the football field during the progress of a football game through the use of a double fixed compound prism, inserted in a small compartment, at eye level in the rod of a standard football down marker. The down marker consists of the usual rod at the top of which are four, flippable, or hinged cards bearing numerals indicating the down. The marker is handled by a lineman (an official) who moves the rod to the position on the sideline which corresponds to the ball's position on the playing field and can therefore be used to determine the progress of the football as it moves parallel to the sideline and to reposition the football between plays relative to the sideline. This is accomplished by the official sighting through the prism which gives him an instantaneous view of the sideline to his right and his left and a line across the playing field precisely at 90 degrees to the sideline, thus the official can instantly determine whether the ball has reached any pre-determined line, such as progressing ten yards to accomplish a first down.

BRIEF DESCRIPTION OF THE DRAWING

FIG. 1 is a perspective view of the present invention
FIG. 2 is a view of the prism location in the rod
FIG. 3 is a view of the lines of sight through the prism complex.

DESCRIPTION OF A PREFERRED EMBODIMENT

Referring to FIGS. 1 and 2, the combination down marker, sighting device consists essentially of circular rod 3 having a lower support end A and an upper support end B which carries the down indicating cards 15 in any usual manner. The intermediate portion of rod 3 has formed therein at approximately eye level of the user a housing 16. Housing 16 has a circular outer shell and a hollow inner area. The circumference of the housing is only slightly greater than the circumference of the rod. The housing is provided with a first pair of apertures 18 and a second pair of apertures 19. Apertures 18 are arranged along a first plane and apertures 19 are arranged along a second plane which is perpendicular to said first plane.

A unitary compound prism member 17 is provided within housing 16. The compound prism member 17 consists of an upper five sided prism 10 which is secured to a square glass lens 11 which is secured to a lower five sided prism 9.

Prism 9 deflects the line of sight there through at a right angle. Prism 10 also deflects the line of sight therethrough at a right angle. Prisms 9 and 10 are arranged so that their respective lines of sight are in opposite directions but along a single plane as indicated at 6 and 7. Glass lens 11 projects a line of sight 8 which is perpendicular to the lines of sight 6 and 7.

Compound prism member 17 is located within housing 16 so that when in use the user sighting through a first of the apertures 18 and through the upper prism 10, the line of sight 7 passes through one of the apertures 19. At substantially the same time the user sights through the aperture 18 and through lower prism 9, the line of sight 6 passes through the second aperture 19.

As can best be seen in FIG. 3, each component of the compound prism is provided with an imaging face which presents images along lines 12, 13, and 14 which extend as a single line vertically through the compound prism. When the rod is held in a vertical position relative to a base line or side line, the image picked up by lower prism 9 will project at image line 12 and the image picked up by upper prism 10 will project at image line 13. With this arrangement, it is an easy and quick process to position the lines of sight 6 and 7 parallel with the sideline of the football field. The user, still sighting through the same aperture 18, through glass lens 11, through the other aperture 18 along sight line 8 which is perpendicular to sight lines 6 and 7 using line of sight 8, can easily and accurately determine where to place the down marker on the sideline relative to the location of the football on the field. When a play must be re-run from the same spot because of an incomplete pass, the football can be accurately repositioned. When a penalty is necessary, the point from which it is to be assessed can be accurately determined. And, the determination of whether or not a first down has been made can quickly be made without bringing the yardage chains out onto the football field.

I claim:

1. A sighting device for determining the position of a football on a football field relative to a sideline of said field, said device comprising:
   a rod having a housing member carried thereby;
   said housing member having four apertures, a first two of said apertures are arranged along one axis and a second two of said apertures are arranged along a second axis which is perpendicular to said first axis;
   a compound prism member mounted within said housing so as to intersect said first and second axises;
   said compound prism member being comprised of an upper prism, an intermediate glass lens and a lower prism;
   said upper prism accomodating a line of sight from one of said first of said two apertures through one of said second two apertures;
   the lower prism accomodating a line of sight from said one of said first two apertures through the other of said second two apertures;
   said glass lens accomodating a line of sight through said one of said first two apertures and which is at right angles to the lines of sight through said second two apertures whereby when the lines of sight through said one and said other of said second two apertures are vertically spaced and aligned parallel with said sideline, the line of sight through said second of said first two apertures is perpendicular to said sideline intermediate said one and said other line of sight so that the exact position of the football on the football field relative to said sideline is determined.

2. The device according to claim 1 wherein the upper portion of said rod carries down cards.

3. The device according to claim 1 wherein the diameter of the housing is only slightly larger than the diameter of the rod.

4. The device according to claim 1 wherein the housing is arranged at a position along the rod which is substantially at eye level of a user.

5. A sighting device for determining the position of a football on a football field comprising:
   a rod having an upper end, a lower support end, and a housing portion carrying a compound prism member;
   said compound prism member consisting of an upper prism and a lower prism which accommodate first and second vertically spaced lines of sight in opposite directions along a single plane and an intermediate lens which accommodates a third line of sight perpendicular to said plane and intermediate said first and second lines of sight;
   whereby when said first and second lines of sight are arranged parallel with a sideline of said football field, said third line of sight is perpendicular to said sideline.

6. The device according to claim 5 wherein said upper prism and said lower prism each consist of a five-sided prism and said intermediate lens is four-sided.

7. The device according to claim 5 wherein down cards are carried on said upper end of said rod.

8. The device according to claim 5 wherein said housing portion is located along an intermediate portion of said rod, said housing having a circumference only slightly larger than the circumference of said rod.

9. A sighting device of the type described comprising:
   a rod of a given diameter having a housing member formed therein along an intermediate portion thereof;
   said housing being of a diameter only slightly larger than the diameter of said rod; and
   a compound prism member mounted within said housing along vertically spaced lines of sight provided through said housing, said compound prism member consisting of one five-sided prism which accommodates a first line of sight at a right angle to a base line, said compound prism further including a glass lens which accommodates a second line of sight along a single plane including said base line, said compound prism further including a second five-sided prism which accommodates a third line of sight at a right angle to said base line, said third line of sight being directed in a direction opposite said first line of sight and perpendicular to said second line of sight.
   whereby when one of said first and third lines of sight are arranged perpendicular said base line, said second of said lines of sight is parallel to that base line.

10. Sighting device of claim 9 wherein said first and third lines of sight are co-planar.

* * * * *